Patented June 5, 1928.

1,672,308

UNITED STATES PATENT OFFICE.

CHARLES R. DOWNS, OF CLIFFSIDE, NEW JERSEY.

CATALYST CARRIER.

No Drawing.   Application filed November 13, 1919.   Serial No. 337,878.

This invention relates to a carrier for catalysts to be used in the process of oxidizing organic compounds in the vapor phase, which will possess excellent lasting qualities, will be easy to produce, and at the same time will enable the chemical reactions to be more easily controlled than can be done with the catalyst carriers now in common use.

Some of the objects of the invention are to provide a carrier for catalysts by means of which the catalyst can be distributed so that the materials that are to undergo chemical transformation can be brought into intimate contact therewith; to provide a catalyst carrier which is a good conductor of heat thereby promoting uniformity of temperature throughout the mass of the catalyst by rapidly conducting away heat developed by the exothermic action; to provide a carrier made of such material that it will not deteriorate appreciably with use and will not deleteriously affect the operation of the catalyst itself or lower its efficiency, nor act catalytically itself to give undesirable by-products during the reaction.

Heretofore a great variety of materials have been used as catalyst carriers. Among them may be mentioned pumice, clay, asbestos, sand, alundum, crystals of $Al_2O_3$, glass wool, kieselguhr, coke, and some of the heavier metals such as nickel, iron and cobalt. The objection to the use of these carriers in certain catalytic reactions is that they do not readily conduct heat or they are injuriously affected during the chemical reactions or fail to maintain the catalysts in their most effective condition, or exert a deleterious effect upon the production of desired products.

I have found that aluminum is a metal whose properties satisfactorily meet the ideal characteristics of a metallic carrier for this purpose. I prefer to use a granular aluminum which has a rough surface similar to the "grained aluminum" of commerce. Such a surface provides a means by which the catalyst adheres more closely than if the granule surfaces are smooth. The aluminium may be made in the form suitable as a carrier for catalysts by melting the metal and stirring the mass while it is being cooled thus resulting in the production of a large number of comparatively small particles as the mass solidifies. These particles will possess somewhat rough and jagged surfaces, thus rendering them better adapted for the catalysts to cling thereto. Other methods of producing the aluminium in suitable form for a catalyst carrier may be used as the particular method of its production above described is for illustrative purposes.

The catalysts may be deposited on the particles of aluminium in the usual way from solutions of the catalysts by introducing th aluminium particles into the solution and evaporating the solvent. For example, ammonium vanadate may be dissolved in water and the roughened particles of aluminium may be introduced and the water evaporated whereupon the crystals of ammonium vanadate are deposited upon the particles of aluminium and stick thereto with a considerable degree of tenacity, especially when the surfaces of the aluminium particles are not perfectly smooth. Likewise the vanadium oxide, when in a form suitable for the reaction, clings very closely to the granular aluminium particles. Also molybdenum oxide and other catalysts used in a similar way adhere very closely. The aluminium is not easily oxidized and even if a certain amount of oxidization of the aluminium catalyst carrier does take place the catalytic reactions will not be seriously interfered with as the aluminium will continue to function as a carrier for the catalyst, and the action of aluminium oxide is similar to but less active than the catalysts ordinarily used in this sort of catalytic reactions.

The particles of aluminium carrying the catalyst may be placed upon screens or perforated plates or may be held in open end or perforated tubes or containers which are placed in the reaction zone. The interstices or spaces between the aluminium particles admit of ready passage of the reaction materials through the mass so that they come into intimate contact with the catalyst that is retained upon the surfaces of the particles of aluminium.

This invention has been found to be especially applicable to highly exothermic reactions in the vapor phase where it is desirable to maintain the temperatures within a narrow range and to prevent one portion of the catalyst from reaching a much higher temperature than another portion. Examples of such reactions are the oxidation of benzene to produce maleic acid, oxidation of anthracene to produce anthraquinone, the oxidation of naphthalene to produce phthalic acid, as well as the partial oxidation of other organic compounds where it is desirable to control the reactions in order to prevent them from progressing too far.

Some of the advantages possessed by aluminium as a carrier for catalysts are its high thermal conductivity as above mentioned; its rigidity, which unlike asbestos fibre, prevents the mass through which the reacting materials are passed from packing thus obstructing and interfering with the free passage of the materials that are being treated; the aluminium particles do not become pulverized by handling, so there is no danger of quantities of dust of the carrier collecting in spots thus choking some of the passages as often happens with other catalyst carriers such as clay or pumice. The aluminium is not attacked by most materials in which it is desired to produce chemical reactions; and it is easy to regain the metallic oxide catalysts such as vanadium, etc., from a catalyst mass carried by aluminium since the catalysts may be dissolved by concentrated nitric acid in which aluminium is insoluble.

What I claim is:

1. As a new article of manufacture, small particles of aluminum having rough surfaces to which a catalyst is attached.

2. As a new article of manufacture, small particles of aluminum having rough surfaces to which a metal oxide catalyst is attached.

3. As a new article of manufacture, small particles of aluminum having rough surfaces to which vanadium oxide is attached.

4. As a new article of manufacture, aluminum having a surface composed of rugged, scraggy prominences and depressions to which a catalyst is attached.

5. As a new article of manufacture, aluminum having a surface composed of rugged, scraggy prominences and depressions to which a metal oxide catalyst is attached.

6. As a new article of manufacture, aluminum having a surface composed of rugged, scraggy prominences and depressions to which vanadium oxide is attached.

7. In the art of exothermic chemical action, the improvement which comprises the use, as a contact body, of a material consisting of small particles of aluminum having rough surfaces with a catalyst attached thereto.

8. In the art of exothermic chemical action, the improvement which comprises the use, as a contact body, of aluminum having a surface composed of rugged, scraggy, prominences and depressions to which a catalyst is attached.

9. In the art of partial oxidation of a hydrocarbon, the improvement which comprises the use, as a contact body of a material consisting of small particles of aluminum having rough surfaces with a catalyst attached thereto.

10. In the art of partial oxidation of a hydrocarbon, the improvement which comprises the use, as a contact body, of aluminum having a surface composed of rugged, scraggy prominences and depressions to which a metal oxide catalyst is attached.

11. In the art of partial oxidation of a hydrocarbon, the improvement which comprises the use, as a contact body, of a material consisting of small particles of aluminum having rough surfaces with vanadium oxide attached thereto.

12. In the art of partial oxidation of a hydrocarbon, the improvement which comprises the use, as a contact body, of aluminum having a surface composed of rugged, scraggy prominences and depressions to which vanadium oxide is attached.

13. In the art of partial oxidation of benzene, the improvement which comprises the use, as a contact body, of a material consisting of small particles of aluminum having rough surfaces with a metal oxide catalyst attached thereto.

14. In the art of partial oxidation of benzene, the improvement which comprises the use, as a contact body, of aluminum having a surface composed of rugged, scraggy prominences and depressions to which a metal oxide catalyst is attached.

15. In the art of partial oxidation of benzene, the improvement which comprises the use, as a contact body, of a material consisting of small particles of aluminum having rough surfaces with vanadium oxide attached thereto.

16. In the art of oxidizing benzene, the improvement which comprises the use, as a contact body, of aluminum having a surface composed of rugged, scraggy prominences and depressions to which vanadium oxide is attached.

17. In the art of producing maleic acid from benzene, the improvement which comprises the use, as a contact body of aluminum having a surface composed of rugged, scraggy prominences and depressions to which vanadium oxide is attached.

In testimony whereof I affix my signature.

CHARLES R. DOWNS.